(12) United States Patent
Song et al.

(10) Patent No.: US 8,264,110 B2
(45) Date of Patent: Sep. 11, 2012

(54) SCANNER MOTOR

(75) Inventors: Sang Jae Song, Gyunggi-do (KR); Young Jin Bae, Gyunggi-do (KR); Song Bon Oh, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 364 days.

(21) Appl. No.: 12/722,223

(22) Filed: Mar. 11, 2010

(65) Prior Publication Data

US 2011/0170154 A1    Jul. 14, 2011

(30) Foreign Application Priority Data

Jan. 8, 2010   (KR) .................. 10-2010-0001735

(51) Int. Cl.
 *H02K 5/16* (2006.01)
(52) U.S. Cl. ........................................ 310/90; 310/67 R
(58) Field of Classification Search ............... 310/67 R, 310/90; 384/101, 118
 See application file for complete search history.

(56) References Cited

U.S. PATENT DOCUMENTS

| | | | | |
|---|---|---|---|---|
| 6,023,114 | A * | 2/2000 | Mori et al. | 310/90 |
| 6,574,186 | B2 * | 6/2003 | Nii et al. | 369/269 |
| 7,466,050 | B2 * | 12/2008 | Kuyama et al. | 310/90 |
| 7,608,957 | B2 * | 10/2009 | Yun | 310/90 |
| 7,626,296 | B2 * | 12/2009 | Kakinuma et al. | 310/90 |
| 8,084,906 | B2 * | 12/2011 | Hidaka et al. | 310/90 |
| 8,132,965 | B2 * | 3/2012 | Mori et al. | 384/118 |
| 8,134,263 | B2 * | 3/2012 | Yazawa et al. | 310/90 |

FOREIGN PATENT DOCUMENTS

| | | |
|---|---|---|
| JP | 2000-232751 | 8/2000 |
| KR | 1020080110619 | 12/2008 |

OTHER PUBLICATIONS

Office Action from counterpart Korean Patent Application No. 10-2010-0001735, Mar. 29, 2011, 3 pages.

* cited by examiner

*Primary Examiner* — Thanh Lam
(74) *Attorney, Agent, or Firm* — Blakley, Sokoloff, Taylor & Zafman, LLP

(57) ABSTRACT

Disclosed herein is a scanner motor. The scanner motor includes a rotating shaft which is axially supported and rotatable, and a bearing which has the shape of a hollow cylinder. The bearing includes a hydrodynamic bearing portion provided on the upper portion of the bearing to rotatably support the rotating shaft, and an oil impregnated sintered bearing portion provided on the lower portion of the bearing.

6 Claims, 3 Drawing Sheets

SCANNER MOTOR

CROSS REFERENCE TO RELATED APPLICATION

This application claims the benefit of Korean Patent Application No. 10-2010-0001735, filed on Jan. 8, 2010, entitled "SCANNER MOTOR", which is hereby incorporated by reference in its entirety into this application.

BACKGROUND OF THE INVENTION

1. Field of the Invention

The present invention relates to a scanner motor.

2. Description of the Related Art

Recently, as electronic devices have developed, high-capacity data storage devices including a compact disk (CD), a digital versatile disk (DVD), a blu-ray disk (BD), and a high definition (HD) DVD have been used. Therefore, disk drives for driving the devices require high-speed rotation.

A polygon mirror scanning motor (hereinafter, referred to as a scanner motor) is mounted to a laser scanning unit of a laser beam printer to deflect a laser beam.

The motor is equipped with a polygon minor and is rotated at high speed to reflect a laser beam having printing information through a surface of the polygon minor and scan the laser beam across an OPC DRUM, thus performing printing.

In order to achieve high printing speed which is the most important advantage and one of the features of the laser beam printer, the rotating speed of the scanner motor must also be increased. The high-speed rotation inevitably leads to noise. In addition to noise generated by friction between the scanner motor and the air according to the rotating speed, an LSU or a printer set is resonated or excited because of the unbalanced mass of the scanner motor, thus causing noise. Thus, in the process of manufacturing the scanner motor, the unbalanced mass is controlled, thus achieving a noise level which is required by the LSU or printer set.

Therefore, there is an urgent need for research into a scanner motor which is manufactured at low cost, in addition to guaranteeing a long lifespan and stability even in super high-speed rotation.

SUMMARY OF THE INVENTION

The present invention has been made in an effort to provide a scanner motor which is capable of acquiring a long lifespan and stability even in super high-speed rotation.

In a scanner motor according to an embodiment of the present invention, a rotating shaft is axially supported and rotatable. A bearing has the shape of a hollow cylinder, and includes a hydrodynamic bearing portion provided on the upper portion of the bearing to rotatably support the rotating shaft, and an oil impregnated sintered bearing portion provided on the lower portion of the bearing.

A contact surface between the oil impregnated sintered bearing portion and the rotating shaft may be a curved surface.

Further, a length of the hydrodynamic bearing portion may be longer than that of the oil impregnated sintered bearing portion.

Further, a gap between the oil impregnated sintered bearing portion and the rotating shaft may range from 0.2 mm to 0.4 mm.

Further, the length of the hydrodynamic bearing portion may range from 2 mm to 6 mm.

Further, a curvature radius of the curved surface may range from 2 mm to 18 mm.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The terminology or words used in the description and the claims of the present invention should not be interpreted as being limited merely to common or dictionary meanings. On the contrary, they should be interpreted based on the meanings and concepts of the invention in keeping with the scope of the invention on the basis of the principle that the inventor(s) can appropriately define the terms in order to describe the invention in the best way.

Hereinafter, scanner motors according to the preferred embodiments of the present invention will be described in detail with reference to the accompanying drawings.

Figure 1:
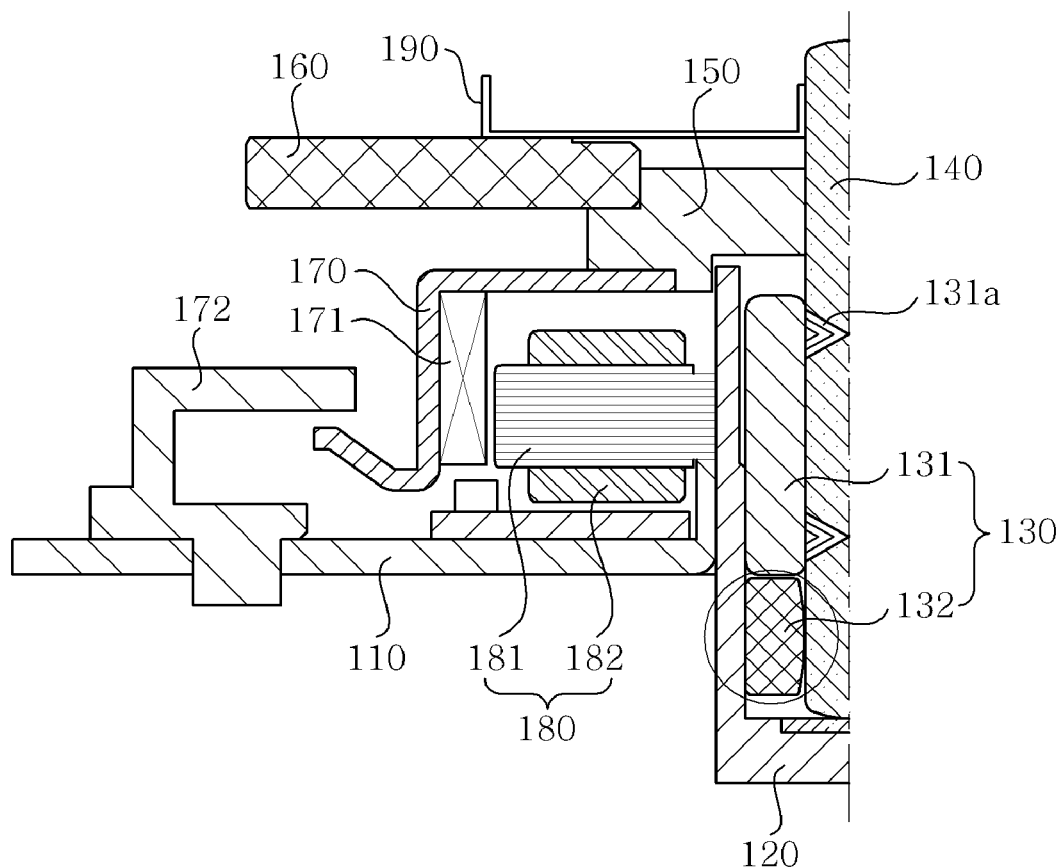
FIG. 1 is a sectional view illustrating a scanner motor according to a preferred embodiment of the present invention.
Figure 2:
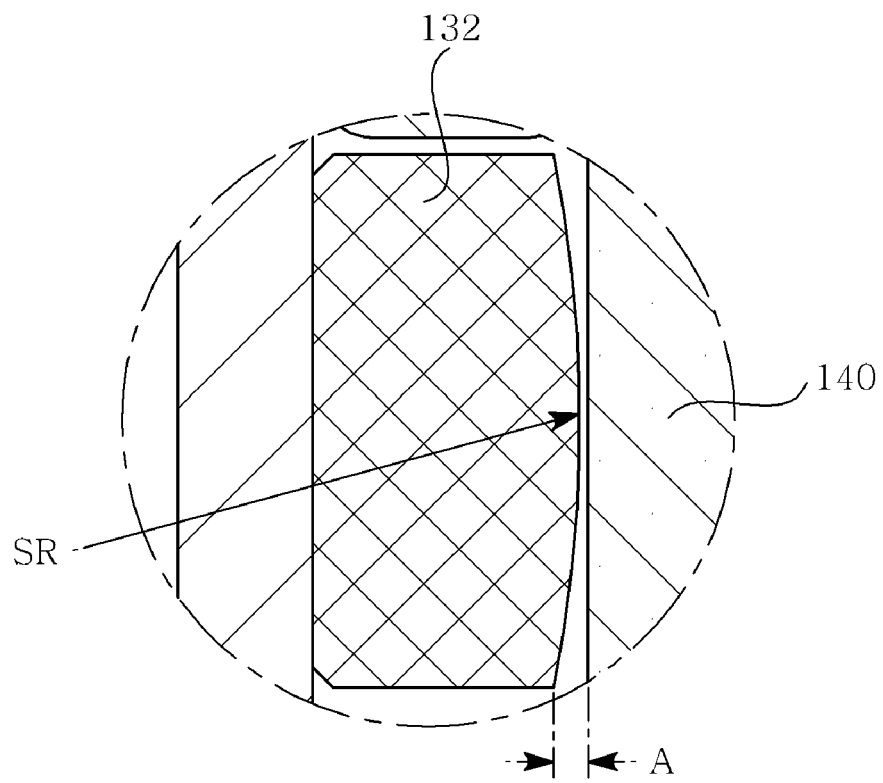
FIG. 2 is an enlarged view illustrating a part of the scanner motor encircled in FIG. 1.

FIGS. 1 and 2 show only half of a scanner motor for convenience of description. The scanner motor has a bilateral symmetric structure.

FIG. 1 is a sectional view illustrating a scanner motor according to a preferred embodiment of the present invention, and FIG. 2 is a partial enlarged view illustrating a bearing of the scanner motor. Hereinafter, the scanner motor 100 according to this embodiment will be described with reference to the accompanying drawings.

As shown in FIG. 1, the scanner motor 100 according to this embodiment includes a base plate 110, a bearing holder 120, a bearing 130, a rotating shaft 140, a housing shaft 150, a polygon minor 160, a rotor case 170, a stator 180, and a support member 190.

The base plate 110 functions to support the entire portion of the scanner motor 100, and is fixedly installed to a device such as a hard disk drive on which the scanner motor 100 is mounted. Here, the base plate 110 is manufactured using a light material, such as an aluminum plate or an aluminum alloy plate. However, the base plate 110 may be manufactured using a steel plate.

The bearing holder 120 functions to hold the bearing 130 which is received in the bearing holder 120. The bearing holder 120 has the shape of a hollow cylinder and is fixedly coupled to the base plate 110, with a stator 180 mounted to the outer circumference of the bearing holder 120. The stator 180 will be described below in detail.

The bearing 130 serves to rotatably support the rotating shaft 140, and has the shape of a hollow cylinder. A hydrodynamic bearing is formed on the inner circumference of the bearing 130 which faces the rotating shaft 140. Here, the bearing holder 120 is generally mounted to the outer circumference of the bearing 130 to support the base plate 110 and allow the bearing 130 and the rotating shaft 140 to smoothly rotate.

The rotating shaft 140 serves to axially support the rotor case 170, is inserted into the bearing 130 and is rotatably supported by the bearing 130.

The housing shaft 150 is connected to the polygon mirror 160 via the support member 190 to be rotatably driven. The housing shaft 150 is fitted over the rotating shaft 140 and is mounted to the top of the rotor case 170.

The polygon minor 160 serves to deflect and scan an optical beam emitted from a light source (not shown), and the central hole of the polygon mirror 160 is fitted over the housing shaft 150. The support member 190 is provided on the top of the polygon minor 160 to prevent the removal or upward movement of the polygon mirror 160 when it is rotated. The support member 190 may be made of an elastic material and may use various shapes of springs.

The rotor case 170 functions to support the polygon minor 160 and the housing shaft 150, and the central opening of the rotor case 170 is fitted over the outer circumference of the rotating shaft 140 in such a way that the rotor case 170 rotates. The rotor case 170 has an upper part which supports the polygon mirror 160 and a side part inside which an annular rotor magnet 171 is installed.

The rotor case 170 may be made of a magnetic material and formed through pressing. Further, the rotor magnet 171 installed in the rotor case 170 is provided to face the stator 180 and rotates the motor using force generated between the rotor magnet 171 and the stator 180.

The stator 180 forms an electric field using external power transmitted thereto so as to rotate the rotor case 170 on which an optical disk or a magnetic disk is mounted. The stator 180 includes a core 181 which comprises a plurality of thin metal sheets and a coil 182 which is wound around the core 181 many times.

The core 181 is fixedly installed to the outer circumference of the bearing holder 120, and the coil 182 is wound around the core 181. Here, the coil 182 forms the electric field using external current applied to the coil 182, thus rotating the rotor case 170 using electromagnetic force between the coil 182 and the rotor magnet 171 of the rotor case 170.

A stopper 172 supports an end of the rotor case 170 at a position above it, thus preventing the rotor case 170 from moving excessively upwards when the motor rotates. The stopper 172 has a variety of shapes to support the end of the rotor case 170.

As shown in FIG. 1, the bearing 130 of the scanner motor 100 according to the present invention includes a hydrodynamic bearing portion 131 which uses fluid pressure by the rotation of the shaft, and an oil impregnated sintered bearing portion 132 which is constructed so that oil impregnated in the sintered bearing portion forms an oil film by the rotation of the shaft, thus supporting the shaft.

The hydrodynamic bearing portion 131 is a sliding bearing which supports the shaft using fluid pressure generated by the rotation of the shaft, and has grooves 131a of proper shapes, thus increasing the fluid pressure. The hydrodynamic bearing portion 131 is advantageous in that it can guarantee a long lifespan and stable rotation even in super high-speed rotation, and thus has been estimated as the most excellent bearing in the present polygon scanner motor.

However, since the hydrodynamic bearing portion 131 is manufactured by mechanically machining a material, high cost of equipment and operation is incurred. Further, the hydrodynamic bearing portion 131 is problematic in that the bearing portion itself does not retain oil, so that its performance is entirely determined by oil injected at an initial stage, and the evaporation of the oil must be strictly controlled.

In order to overcome the problems of the hydrodynamic bearing portion 131, the oil impregnated sintered bearing portion 132 is provided under the hydrodynamic bearing portion 131. The oil impregnated sintered bearing portion 132 is operated such that oil impregnated in the sintered bearing portion is discharged by the rotation of the shaft to form the oil film, thus supporting the shaft; that is, an air layer is formed in metal powder in the bearing portion, so that the oil may circulate in and out the bearing portion.

The oil impregnated sintered bearing portion 132 is advantageous in that it acquires a relatively long lifespan and stability at lower manufacturing cost. That is, since the bearing portion itself retains oil, the oil is reliably supplied to the bearing portion even at high temperature and for a lengthy period of time, and the bearing portion is not much affected by the evaporation of the oil.

The oil impregnated sintered bearing portion 132 has a drawback in that it is difficult to acquire a long lifespan and stable rotation in super high-speed rotation. However, the drawback is compensated for by the hydrodynamic bearing portion 131 provided on the upper portion of the bearing 130.

Therefore, the present invention provides the scanner motor 100 having the hybrid type bearing 130 which is provided with both the hydrodynamic bearing portion 131 and the oil impregnated sintered bearing portion 132 which have different advantages and disadvantages as described above, thus guaranteeing a long lifespan and stable rotation even in super high-speed rotation, in addition to reducing manufacturing cost.

Here, the hydrodynamic bearing portion 131 is manufactured to be shorter than a conventional hydrodynamic bearing portion. In order to solve reduction in stability of the bearing portion which may result from reduction in length of the hydrodynamic bearing portion 131, the oil impregnated sintered bearing portion 132 having a length which corresponds to the reduced length is provided. Hence, the present invention provides the bearing 130 which guarantees a long lifespan and stable rotation in super high-speed rotation and is manufactured at low cost.

Further, the present invention provides the scanner motor 100 which is capable of maximally showing the advantages of the hydrodynamic bearing portion 131 and the oil impregnated sintered bearing portion 132 by adjusting the length ratio of the hydrodynamic bearing portion 131 to the oil impregnated sintered bearing portion 132.

The hydrodynamic bearing portion 131 and the oil impregnated sintered bearing portion 132 are not limited to specific length. However, since the bearing 130 has the hydrodynamic bearing portion 131 as a basic part thereof, it is preferable that the hydrodynamic bearing portion 131 be longer than the oil impregnated sintered bearing portion 132. The oil impregnated sintered bearing portion 132 may have a length from 2 mm to 6 mm.

The oil impregnated sintered bearing portion 132 is provided under the hydrodynamic bearing portion 131, thus allowing oil to be continuously supplied from the oil impregnated sintered bearing portion 132 although oil injected at the initial stage is abnormally evaporated, dissipated or leaked, therefore obviating the strict control for the evaporation of oil.

FIG. 2 is an enlarged view illustrating the state in which the oil impregnated sintered bearing portion 132 of the bearing 130 according to the present invention is in contact with the rotating shaft 140. A contact surface of the oil impregnated sintered bearing portion 132 which is in contact with the rotating shaft 140 is formed to be a curved surface SR, thus minimizing the loss of driving force, and supporting the shaft, therefore achieving stable rotation.

Here, a maximum gap A between the rotating shaft 140 and the oil impregnated sintered bearing portion 132 is set to be 0.2 mm to 0.4 mm at which the surface tension of the oil starts to decrease, thus minimizing loss caused by the surface tension. In the case of the oil which is generally used, if the maximum gap A is 0.3 mm or more, the surface tension is reduced by a considerable level.

Thus, in consideration of the surface tension, the maximum gap A is designed to be 0.3 mm or more. However, according to the present invention, if the maximum gap A is excessively larger than 0.3 mm, the dynamic pressure of the hydrodynamic bearing portion may escape through the gap. Thus, it is most preferable that the maximum gap A be 0.3 mm.

Further, when the length of the oil impregnated sintered bearing portion 132 ranges from 2 mm to 6 mm, the curvature radius of the curved surface SR ranges from 2 mm to 18 mm.

Figure 3:
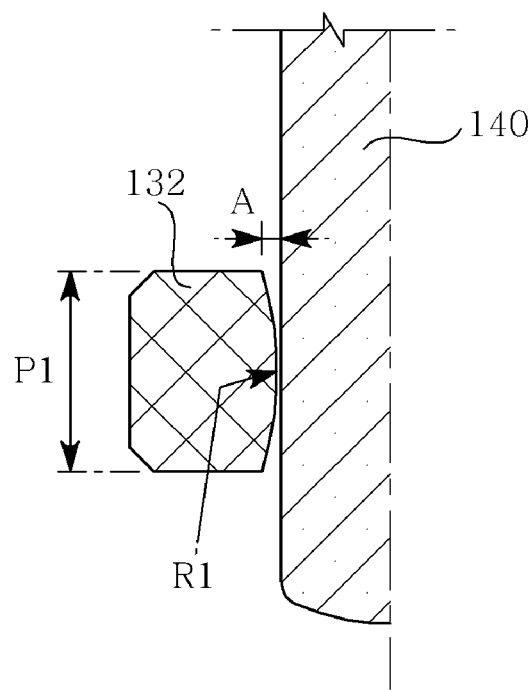
FIG. 3 is a sectional view illustrating a bearing according to another preferred embodiment of the present invention.

FIG. 3 is a view illustrating the oil impregnated sintered bearing portion 132 having the length P1 of 2 mm. In this case, it is preferable that the curvature radius R1 be about 2 mm. Further, it is most preferable that the maximum gap A of the oil impregnated sintered bearing portion 132 be 0.3 mm. At this time, the surface tension is minimized.

Figure 4:
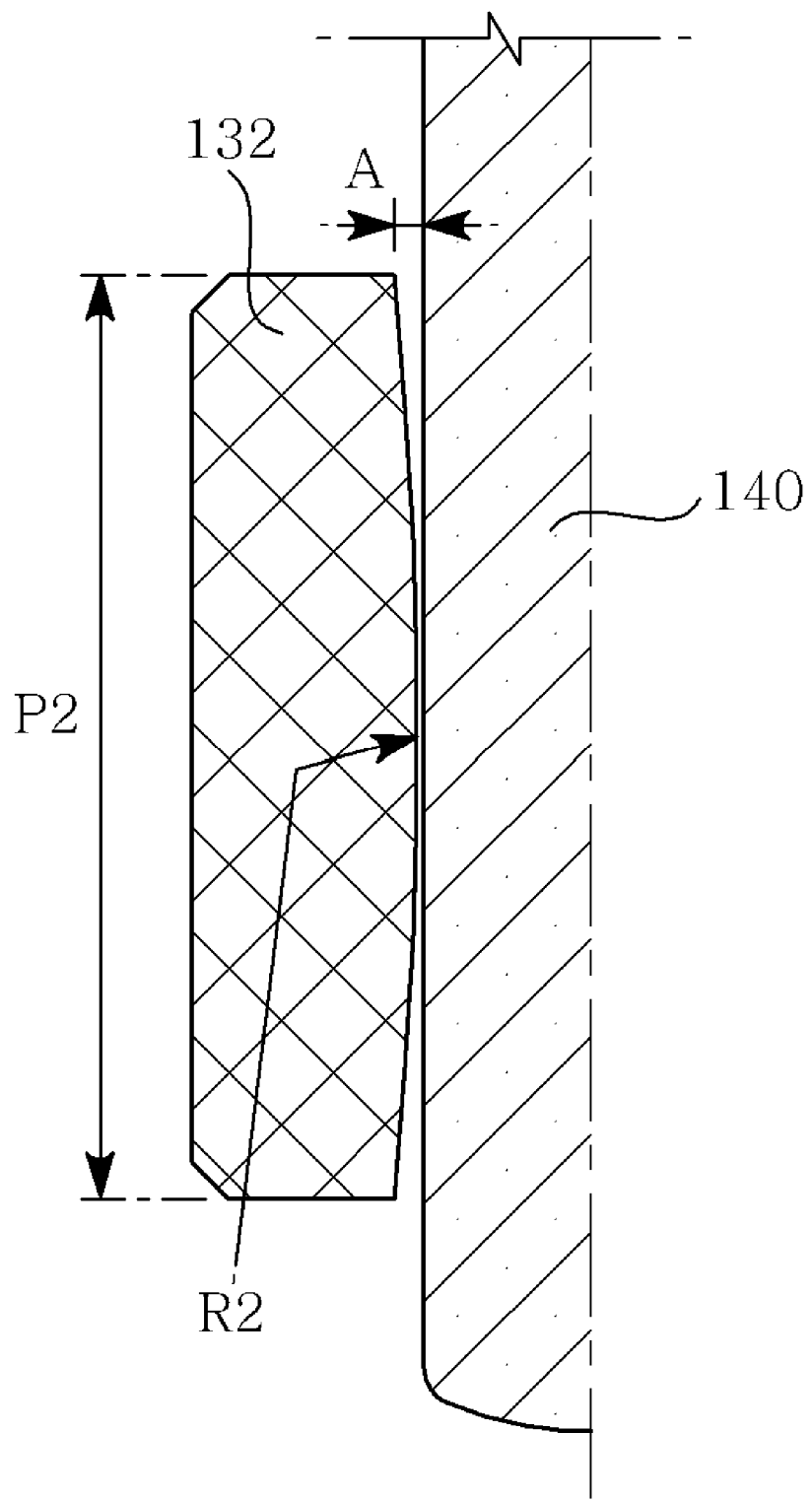
FIG. 4 is a sectional view illustrating a bearing according to a further preferred embodiment of the present invention.

FIG. 4 is a view illustrating the oil impregnated sintered bearing portion 132 having the length P2 of 6 mm. In this case, it is preferable that the curvature radius R2 be about 18 mm. Most preferably, the maximum gap A of the oil impregnated sintered bearing portion 132 is also 0.3 mm. At this time, the surface tension is minimized.

As described above, the present invention provides a scanner motor, which includes a hybrid type bearing having both a hydrodynamic bearing portion and an oil impregnated sintered bearing portion, thus guaranteeing a long lifespan and stability even in super high-speed rotation, and reducing manufacturing cost.

Here, the hydrodynamic bearing portion is a sliding bearing which supports a shaft using fluid pressure generated by the rotation of the shaft, and includes a groove of a proper shape, thus increasing the fluid pressure. Such a hydrodynamic bearing portion is advantageous in that a long lifespan and stable rotation are acquired even in super high-speed rotation, and has been estimated as the most superior bearing in a present polygon scanner motor.

Further, the oil impregnated sintered bearing portion provided under the hydrodynamic bearing portion is operated so that oil impregnated into the sintered bearing portion is discharged by the rotation of the shaft, thus forming an oil film and supporting the shaft. That is, an air layer is formed in metal powder, thus allowing the oil to circulate in and out the bearing portion.

Such an oil impregnated sintered bearing portion is advantageous in that it realizes a relatively long lifespan and high stability, in addition to reducing manufacturing cost. That is, the bearing portion itself retains oil, thus enabling the stable supply of oil even when it has been used for a lengthy period of time at high temperature. Further, it is not much affected by the evaporation of the oil.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanner motor, comprising:
    a rotating shaft axially supported and rotated; and
    a bearing having a shape of a hollow cylinder, and comprising:
        a hydrodynamic bearing portion provided on an upper portion of the bearing to rotatably support the rotating shaft; and
        an oil impregnated sintered bearing portion provided on a lower portion of the bearing.

2. The scanner motor as set forth in claim 1, wherein a contact surface between the oil impregnated sintered bearing portion and the rotating shaft is a curved surface.

3. The scanner motor as set forth in claim 1, wherein a length of the hydrodynamic bearing portion is longer than a length of the oil impregnated sintered bearing portion.

4. The scanner motor as set forth in claim 1, wherein a gap between the oil impregnated sintered bearing portion and the rotating shaft ranges from 0.2 mm to 0.4 mm.

5. The scanner motor as set forth in claim 1, wherein the length of the hydrodynamic bearing portion ranges from 2 mm to 6 mm.

6. The scanner motor as set forth in claim 2, wherein a curvature radius of the curved surface ranges from 2 mm to 18 mm.

* * * * *